(12) United States Patent
Naccari et al.

(10) Patent No.: US 9,877,025 B2
(45) Date of Patent: Jan. 23, 2018

(54) VIDEO ENCODING AND DECODING WITH PREDICTION AT HIGHER PRECISION

(71) Applicant: BRITISH BROADCASTING CORPORATION, London (GB)

(72) Inventors: Matteo Naccari, London (GB); Marta Mrak, London (GB)

(73) Assignee: British Broadcasting Corporation, London (GB)

( * ) Notice: Subject to any disclaimer, the term of this patent is extended or adjusted under 35 U.S.C. 154(b) by 431 days.

(21) Appl. No.: 13/940,581

(22) Filed: Jul. 12, 2013

(65) Prior Publication Data

US 2015/0016515 A1    Jan. 15, 2015

(51) Int. Cl.
*H04N 19/124* (2014.01)
*H04N 19/12* (2014.01)
*H04N 19/176* (2014.01)
*H04N 19/61* (2014.01)

(52) U.S. Cl.
CPC ........... *H04N 19/124* (2014.11); *H04N 19/12* (2014.11); *H04N 19/176* (2014.11); *H04N 19/61* (2014.11)

(58) Field of Classification Search
CPC .... H04N 19/124; H04N 19/12; H04N 19/176; H04N 19/61
See application file for complete search history.

(56) References Cited

U.S. PATENT DOCUMENTS

| | | | | |
|---|---|---|---|---|
| 2010/0166069 A1* | 7/2010 | Goel | ........... | H04N 19/176 375/240.13 |
| 2011/0032987 A1* | 2/2011 | Lee | ........... | H04N 19/105 375/240.12 |
| 2011/0280302 A1* | 11/2011 | Alshina | ........... | H04N 19/42 375/240.03 |
| 2013/0114730 A1* | 5/2013 | Joshi | ........... | H04N 7/30 375/240.18 |

(Continued)

FOREIGN PATENT DOCUMENTS

WO    2013/001279    1/2013

OTHER PUBLICATIONS

Sullivan et al., "Overview of the High Efficiency Video Coding (HEVC) Standard," IEEE Transactions on Circuits and Systems for Video Technology, vol. 22, No. 12, Dec. 2012, pp. 1649-1668.*

(Continued)

*Primary Examiner* — Thai Tran
*Assistant Examiner* — Christopher T Braniff
(74) *Attorney, Agent, or Firm* — Michael Best & Friedrich LLP

(57) ABSTRACT

A video decoder has a transform mode and a transform skip mode and in the transform skip mode a residual prediction mode is selected. A compressed bit-stream is entropy-decoded to obtain a block of quantised values. An inverse quantiser operates in the transform mode to form transform coefficients and in the transform skip mode to form differential residual values. In the transform mode an inverse transform is performed to form residual values. In the (Continued)

transform skip mode residual prediction is used perform residual prediction using high accuracy locally decoded residual value. The residual value is then down-scaled to obtain the reconstructed residual. A block predictor is formed from decoded image values at the same precision at which video samples are stored in the frame memory.

8 Claims, 8 Drawing Sheets

(56) References Cited

U.S. PATENT DOCUMENTS

2014/0362917 A1* 12/2014 Joshi ...................... H04N 19/46
375/240.13

OTHER PUBLICATIONS

Sole et al., "Transform Coefficient Coding in HEVC," IEEE Transactions on Circuits and Systems for Video Technology, vol. 22, No. 12, Dec. 2012, pp. 1765-1777.*

Lee et al., "AHG7: Residual DPCM for HEVC Lossless Coding," Joint Collaborative Team on Vido Coding (JCT-VC) of ITU-T SG 16 WP 3 and ISO/IEC JTC 1/SC 29/WG11, Document JCTVC-L0 17, 12th Meeting: Geneva, CH, Jan. 2013.*

Lainema et al., "Intra Coding of the HEVC Standard," IEEE Transactions on Circuits and Systems for Video Technology, vol. 22, No. 12, Dec. 2012, pp. 1792-1801.*

G. Bjøntegaard, "Calculation of average PSNR differences between RD-curves", VCEG-M33, Austin, TX, USA, Apr. 2001.

* cited by examiner

Directions horizontal and vertical      Diagonal directions 45 and 135 degrees

VIDEO ENCODING AND DECODING WITH PREDICTION AT HIGHER PRECISION

FIELD OF THE INVENTION

This invention is related to video compression and decompression systems, notably to a method which allows improvement of the compression efficiency of video coding by performing prediction of samples in high precision.

BACKGROUND TO THE INVENTION

This invention is directed to the video compression area which aims at reducing the bit-rate required to transmit and store a video content while maintaining at the same time an acceptable visual quality (lossy coding). Data compression in lossy video coding is achieved by discarding some redundant information in the source data. The lost information cannot be recovered at the decoder and this loss may introduce some quality degradation (artefacts). To limit the annoyance of artefacts, the information to be discarded should be carefully selected by efficiently exploiting the redundancy among video data. Lossy video coding techniques as those standardised by the H.264/AVC and H.265/HEVC standards aim at reducing data redundancy by exploiting both spatial and temporal correlation. In particular, spatial correlation allows prediction of the value of each sample by a set of neighbouring samples that lie outside the current block of samples. On the other hand, temporal correlation is exploited by predicting the value of one sample with the value of another sample which belongs to a different frame in temporal order. Both in spatial and temporal prediction, the predicted value is then subtracted from the current sample value and the difference is then transformed, quantised and entropy encoded using techniques know by those skilled in the art. Spatial transform provides an efficient representation of the prediction difference using a fewer number of coefficients. Quantisation instead performs the aforementioned data reduction by discarding or scaling the values of transform coefficients. Generally, the difference between an original sample and its prediction is called residual. Spatial transforms as the well-known Discrete Cosine Transform (DCT) are effective in image and video compression only if they can provide a representation of the input residuals which is sparse in the transform domain. In fact it is well known by those skilled in the art that entropy encoding techniques are very efficient over sparse signals. However, if the input residual is already sparse, the spatial transformation should not be applied as it may provide a number of coefficients different from zero which is higher than their counterparts in the input. When the spatial transform is skipped, the input residuals are then directly quantised and entropy encoded. It should noted that even when the transform is skipped because the input residuals are sparse, some spatial correlation may be still present and can be exploited by some sample-based prediction techniques. The signal obtained after residual prediction is called differential residual. Differential residuals can be quantised and entropy encoded in a similar way as residuals. Finally, it is also known by those skilled in the art that increasing the accuracy for the encoding processing (e.g. prediction, transformation, etc.) improves the compression efficiency of video codecs. However, this increased precision requires more storing resources to keep reconstructed data for future prediction.

SUMMARY OF THE INVENTION

This invention aims at improving coding efficiency in video coding by using high accuracy sample values during prediction. While a video decoder provides reconstructed samples with values that cover specific range, for example 0 to $2^B$, it would be useful if some modules of the prediction can use a higher range, for example 0 to $2^{B+BI}$ with BI>0, in order to benefit from better precision of the predictors as well as of the entropy decoded samples.

Typically video decoder reconstructs samples from an image block and in agreed accuracy stores them in frame buffers to be used for further processing (e.g. in-loop filters), prediction (intra or inter) and finally for display. However, the compression can be improved when increased accuracy of samples (higher range of values) is used. While it is typically expensive to store reconstructed samples in higher accuracy this invention introduces a concept where the prediction operates in higher accuracy, compared to the accuracy of reconstructed samples from frame buffers.

This invention increases the precision of the predictor applied to differential samples, i.e. the samples obtained after subtraction of the signal x with the predictor p, d=x−p. It will be understand by the embodiments of this invention that the signal x can be both original video signal s or a different representation obtained starting from s. One example of differential signal d is given by subtracting s with a predictor p. In this invention this differential samples will be denoted as residuals. Another example of differential samples is given by the subtraction of the residual d with another predictor p'. In this invention this differential samples will be denoted as differential residuals.

In one aspect, the present invention consists in a video decoder serving to reconstruct an image from differential samples, comprising a predictor for forming a predictor from reconstructed data with higher precision than the precision of the finally reconstructed image samples to be the output of the decoder; an adder for adding the obtained predictor to the differential samples at the matching accuracy to obtain the reconstructed samples; and a down-scaler for performing down-scaling of the reconstructed samples to the required accuracy. The differential samples may be residual samples or differential residual samples.

Preferably, reconstructed residual samples are kept in higher precision for reconstruction of other residual samples in the block.

Advantageously, in a transform skip mode, differential residual samples are obtained by inverse quantisation in the spatial domain and the predictor is added to the differential residual samples and where in a transform mode an inverse transform is applied. The process of residual reconstruction may be followed by down-scaling of residual samples to the same precision as the samples at the output of the inverse transform.

In some embodiments, the video decoder has a residual predictor unit for forming a residual predictor from reconstructed data with higher precision than the precision of the finally reconstructed image samples to be the output of the decoder; a first adder for adding the residual predictor to the differential samples at the matching accuracy to obtain the reconstructed residual samples; a block predictor unit for forming a block predictor from reconstructed data with higher precision than the precision of the finally reconstructed image samples to be the output of the decoder; a second adder for adding the block predictor to the residual samples at the matching accuracy to obtain the reconstructed samples.

Suitably, for a current block or a plurality of current blocks, a mode is selected from at least a transform mode and a transform skip mode; in the transform skip mode a residual prediction mode is selected for a current block or a current plurality of blocks; a compressed bit-stream is entropy-decoded to obtain a block of quantised values; the quantised values in the transform mode are inverse quantising to form the transform coefficients and the quantised values in the transform skip mode are inverse quantised to form differential residual values; in the transform mode an inverse transform process is performed on the transform coefficients to form residual values; for blocks on which residual prediction is used residual prediction is performed using high accuracy locally decoded residual value; a block predictor is formed in a higher precision from the decoded image values that are used to form the predictor; the residual values are added to a block predictor; and down-scaling the obtained reconstructed image sample values.

Alternatively, for a current block or a plurality of current blocks a mode is selected from at least a transform mode and a transform skip mode; in the transform skip mode a residual prediction mode is selected for a current block or a current plurality of blocks; a compressed bit-stream is entropy-decoded to obtain a block of quantised values; the quantised values in the transform mode are inverse quantised to form the transform coefficients and the quantised values in the transform skip mode are inverse quantised to form differential residual values; in the transform mode an inverse transform process is performed on the transform coefficients to form residual values; for blocks on which residual prediction is used residual prediction is performed using high accuracy locally decoded residual value; the obtained residual value is down-scaled to obtain the reconstructed residual; a block predictor is formed from the decoded image values that are used to form the predictor at the same precision at which video samples will be stored in the frame memory; and the residual values are added to a block predictor to obtain the reconstructed image sample values.

Differential residuals may be formed from residuals by performing sample-based prediction according to one of the following modes: no prediction, prediction along horizontal direction, prediction along vertical direction and prediction along one or more diagonal directions.

The use of the sample-based residual prediction direction may be decoded from the bit-stream via two binary flags: one to indicate the use of sample-based residual prediction and the other to indicate the direction to perform sample-based residual prediction; or via three binary flags: the first flag is used to indicate the use of sample-based residual prediction, the second is used to signal the type of prediction direction and the third is used to signal the prediction direction. For intra coded blocks the selection of the residual predictor mode may be determined by the intra block prediction mode and for inter coded blocks the selection of residual prediction mode is signalled in the bit-stream.

The precision of the result of the addition of the predictor and the differential samples in higher accuracy may be reduced by clipping to a precision that is higher than the precision of the reconstructed samples.

In another aspect, the present invention consists in a method of video encoding an input image in a processor, in which a locally decoded image is formed to avoid drift between an encoder and a remote decoder, the method comprising the steps of forming a predictor from reconstructed data with higher precision than the precision of the input image; subtracting the obtained predictor at the matching accuracy from the input image to obtain differential samples for use in forming the encoded output; performing down-scaling of the differential samples for use in forming a locally decoded image at the same precision as said input image. The predictor may be subtracted from the input image so that the differential samples are residual samples or the predictor may be subtracted from residual samples so that the differential samples are differential residual samples. Reconstructed residual samples may be kept in higher precision for reconstruction of other residual samples in the block.

The method of video encoding may comprise the steps of forming a block predictor from reconstructed data with higher precision than the precision of the input image; subtracting the block predictor at the matching accuracy from the input image to obtain residual samples; forming a residual predictor from reconstructed data with higher precision than the precision of the input image; subtracting the residual predictor at the matching accuracy from the residual samples to obtain differential residual samples for use in forming the encoded output.

The method of video encoding may further comprise the steps of selecting for a block of residual samples between at least a transform mode in which the residual block undergoes a transform process and a transform skip mode in which the residual block undergoes no transform process; in the transform mode performing a transform process on the residual block to form a transform block of transform coefficients having a defined accuracy; and performing up-scaling only in the transform skip mode to bring the residual samples to said defined accuracy.

For intra block prediction modes the selection of the residual predictor mode may be determined by the intra block prediction mode and for inter coded blocks, an encoding cost may be calculated for each residual predictor mode and the mode having the lowest cost selected and signalled in the bit-stream.

In still another aspect, the present invention consists in a non-transitory computer program product comprising instructions adapted to cause programmable apparatus to implement a method of video decoding to reconstruct an image from differential samples, the method comprising the steps of:
  forming a predictor from reconstructed data with higher precision (accuracy) than the precision of the finally reconstructed image samples to be the output of the decoder;
  adding the obtained predictor to the differential samples at the matching accuracy to obtain the reconstructed samples; and
  performing down-scaling of the reconstructed samples to the required accuracy.

DETAILED DESCRIPTION OF THE PRESENT INVENTION

Figure 1:
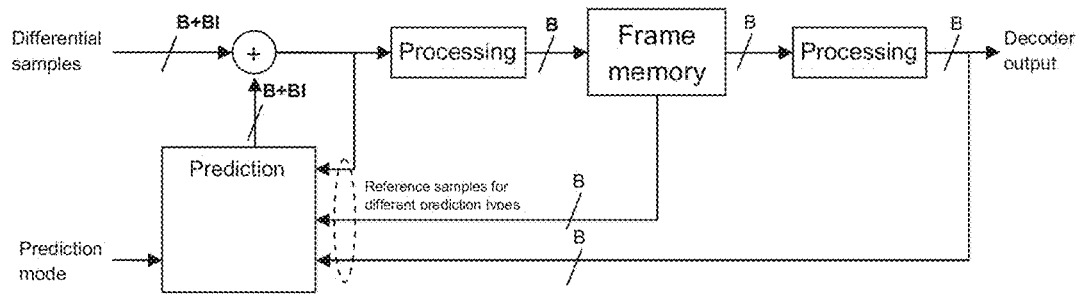
FIG. 1 shows the general framework for reconstruction of differential samples in higher accuracy (B+BI) according to the invention, where the down-scaling to the lower precision (B) is done during other processing steps.

The present invention is now described in detail starting with the general framework which performs reconstruction from differential samples using a predictor in higher accuracy (see FIG. 1). Then the invention is detailed in several specific instances derived from this general framework. There is disclosed herein a method for reconstructing video pixels from differential samples using a predictor with higher precision (accuracy) values.

Accordingly, the residual samples are reconstructed by adding a predictor with precision equal to B+BI. The obtained samples are stored in the frame memory at precision equal to B and made available for reconstruction of future video pixels. The processing operated over the frames stored in memory will be still carried out with precision equal to B and the up-scaling to increased precision B+BI will be performed in the prediction module as illustrated in FIG. 1. It should be noted that typical addition and subtraction operations increase the dynamic range (which can also be interpreted as increase of bit-depth) of input samples by 1. However, in this invention and supporting examples such increase is not treated as precision (accuracy) increase.

The processing operated on the reconstructed frame depends on the selected video compression technology. In one example, the video compression technology may be specified by the MPEG-x and H.26x families. A codec compliant to these families operates on a block basis where the predictor can be computed using intra or inter prediction methods known by those skilled in the art. An example of prediction with higher accuracy is demonstrated in an example from FIG. 2 that adds higher precision prediction in a decoder operating according to the MPEG-x or H.26x standard families. In this figure, once the differential samples have been processed according to the used standard, the prediction (intra or inter) is added to obtained the reconstructed frame. This addition is done at precision B+BI followed by a down-scaling operation to bring the reconstructed frame at precision B where the subsequent processing is performed. In this example the processing is operated as in-loop filtering to get both the reconstructed frames and the inter predictor.

Figure 3:
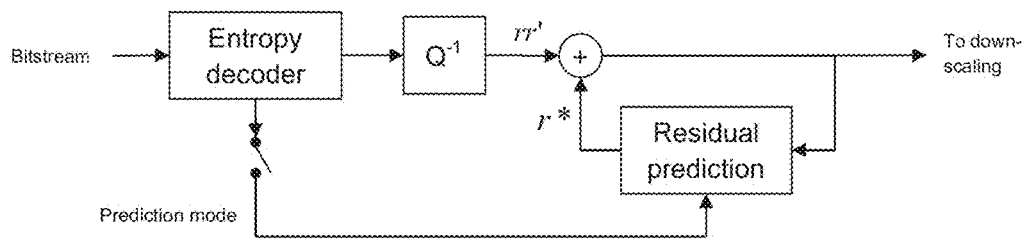
FIG. 3 shows an example of decoder for reconstruction of residuals from compressed differential residuals in higher accuracy.

FIG. 3 depicts a decoder for differential samples processing where the compressed bit-stream containing coded video data is received and entropy decoded using techniques known by those skilled in the art. In this example the differential samples refer to the differential residual obtained after application of sample-based prediction techniques to the residuals associated to the original video signal. Once the differential residuals have been decoded they are re-expanded to their original dynamic range using an inverse quantiser. The obtained differential residual is then added to a predictor in higher accuracy to reconstruct the residual sample which will be then down-scaled to a lower precision where further processing can be performed. The decoder in FIG. 3 receives the differential samples produced by the encoder in FIG. 4. In this case the residuals coming from some earlier processing on original samples are provided in higher precision. The residuals are then subtracted with the predictor r* still in higher accuracy and then compressed using a quantisation operation Q. The obtained quantised values are then fed into a entropy encoder to form a compressed video bit-stream. It should be noted that in order to avoid any drift between the samples used by the encoder and the decoder, the encoder in FIG. 4 contains also the inverse quantisation operation used by the decoder to exactly recover the same samples used during decompression. In the following a more detailed example on how the encoder in FIG. 4 performs differential residuals compression is provided.

Figure 4:
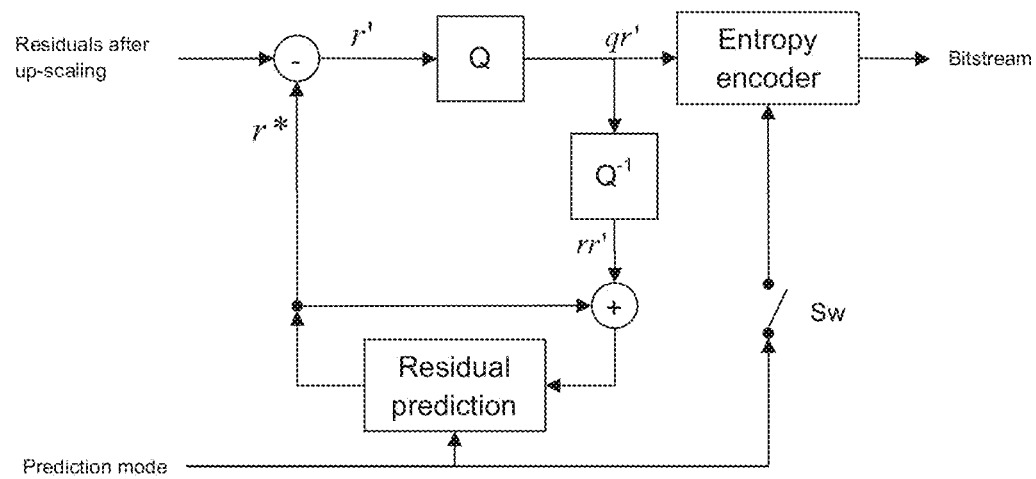
FIG. 4 shows an example of encoder that compresses the differential residuals.
Figure 5:
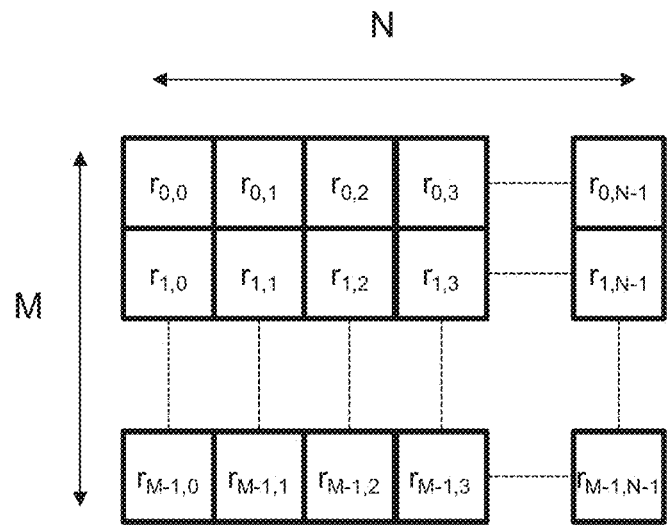
FIG. 5(a) shows a block of residual samples associated to a coding block with M rows and N columns.
FIG. 5(b) shows a sample-based prediction of residuals along the horizontal direction to obtain the differential residual associated to the coding block.
FIG. 5(c) shows a sample-based prediction of residuals along the vertical direction to obtain the differential residual associated to the coding block.
FIG. 5(d) shows common sample-based prediction directions (horizontal and vertical) and additional prediction directions for prediction of residuals associated to the coding block.
Figure 5:
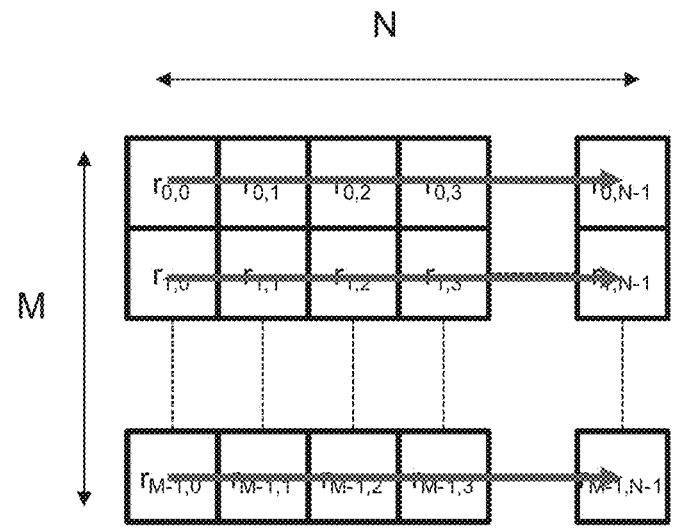
Figure 5:
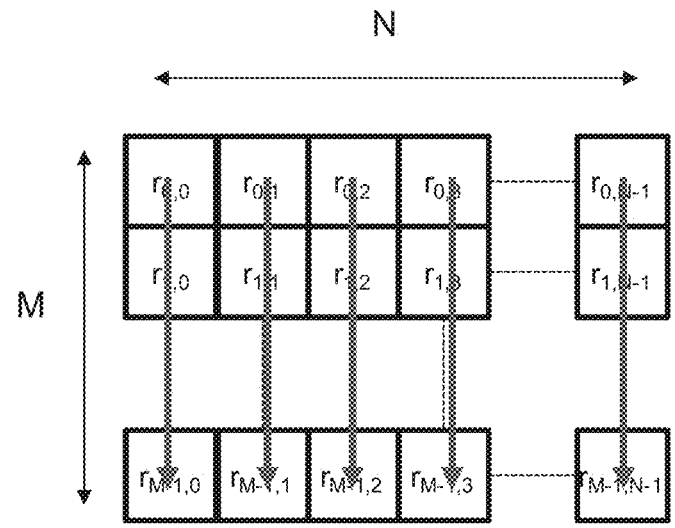
Figure 5:
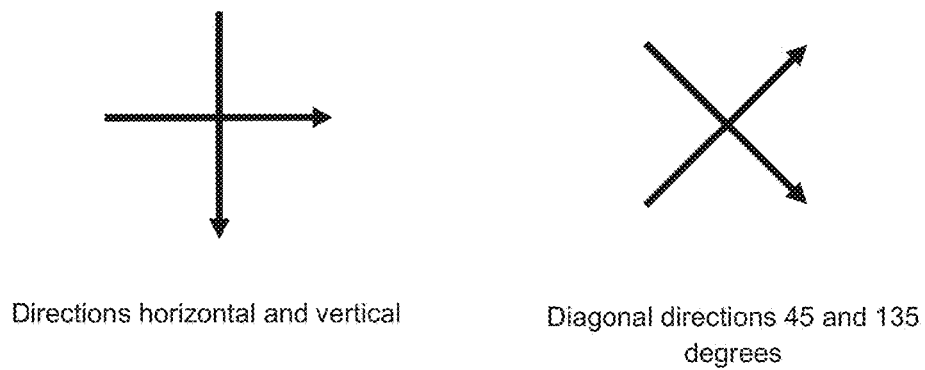

The residual predictor module in both FIG. 3 and FIG. 4 may comprise the directional prediction modes—horizontal direction prediction and a vertical direction prediction. More precisely, FIG. 5(a) shows an example of residual samples associated to a coding block with M rows and N columns. FIG. 5(b) shows the horizontal prediction direction to obtain the differential residuals while FIG. 5(c) shows the vertical prediction direction.

For the horizontal direction prediction and given the sample of the residual block residing on the x-th column and y-th row $r(y,x)$, the corresponding sample of the differential residual block on the x-th column and y-th row $r'(y,x)$ is given by $r'(y,x)=r(y,x)-r^*(y,x-1)$ with r* being the reconstructed residual sample, i.e. obtained after inverse quantisation and adding back the residual predictor to the decoded value of differential residual.

For the vertical direction prediction and given the coefficient of the residual block residing on the x-th column and y-th row $r(y,x)$, the corresponding coefficient of the differential residual block on the x-th column and y-th row $r'(y,x)$ is given by $r'(y,x)=r(y,x)-r^*(y-1,x)$.

The up-scaling operated to increase the accuracy of the residual inputs shown in FIG. 4 brings the differential residuals at a higher level of representation. The residual prediction, forward quantisation, inverse quantisation and addition with the residual predictor are all carried out in this higher level of accuracy domain. The up-scaling process is reverted only after the inverse quantised differential residual has been added back to its predictor. Therefore in another aspect, this invention specifies the following processing steps for each residual sample:
 1. Perform up-scaling to increase the precision accuracy of the current input residual.
 2. Perform sample-based residual prediction according to the selected prediction mode to obtain the differential residual.

3. Perform quantisation on the obtained differential residual value.
4. Perform inverse quantisation.
5. Add the obtained reconstructed differential residual to the residual predictor selected according to chosen prediction mode and store this reconstructed residual value for prediction of future differential residual samples.

The residual up-scaling is reverted at the decoder after inverse quantisation and inverse prediction (reconstruction) of the residual. In particular, as shown in FIG. 3 the down-scaling is operated after the residual has been reconstructed.

Prediction of residuals can be associated with e.g. horizontal directional prediction of residuals. In this example, at the encoder the residual prediction is used for each residual sample r(y, x) at y-th row in x-th column of given block of samples to compute the differential residual r'(y, x) and its quantised version qr'(y, x):

$$qr'(y, x) = \begin{cases} Q(r(y, x) \cdot S), & \text{if } x = 0 \\ Q(r(y, x) \cdot S - r^*(y, x-1)), & \text{otherwise} \end{cases} \quad (1)$$

where Q denotes the forward quantisation operation and S is the up-scaling factor to increase the level of accuracy. In this approach the reconstructed value of each residual sample after inverse quantisation may be obtained at the decoder by simply adding the reconstructed residual values (i.e. after inverse quantisation) preceding the current sample according to the adopted sample scanning order (in this case horizontal). The residuals from Eq. (1) can be then reconstructed as:

$$r^*(y, x) = \sum_{i=0}^{x} Q^{-1}(qr'(y, i)), \quad (2)$$

where $Q^{-1}$ denotes the inverse quantisation operation. Over the obtained residuals r* the down-scaling needed to bring each sample to its original input level can be then performed as division of r* with the scaling factor S and then rounding the obtained value to the nearest integer.

In the case of intra prediction, the choice of performing the prediction of residuals and the choice of direction for the prediction can be derived from the prediction strategy applied on original block samples (i.e. from intra prediction mode as defined in e.g. H.264/AVC or HEVC). In inter case a different approach can be used, i.e. the choices on whether to perform prediction of residuals and related directions can be signalled in the bit-stream. Once the prediction direction which minimises the coding cost measure is selected at the encoder side, it is transmitted in the bit-stream using entropy encoding techniques. The described horizontal and vertical predictions may not improve the compression efficiency for all blocks. In fact, there may be some blocks where the residuals are correlated along directions different from the horizontal and vertical ones. For these blocks, the encoder signals to the decoder that no further prediction should be performed. Note that this invention does not exclude other possible prediction strategies and directions, but for simplicity the descriptions only consider horizontal and vertical prediction directions.

In one example, sample-based residual prediction technique is represented by the Differential Pulse Code Modulation (DPCM) which predicts each sample from one or more samples in the neighbourhood and along specific directions.

When prediction of residuals is used, the residual prediction mode may not need to be signalled for intra coded blocks while it does need to be signalled for inter blocks. As an example, if DPCM is used as residual prediction technique, the signalling can be performed with one three value flag to indicate whether no DPCM, DPCM along the horizontal or DPCM along the vertical direction is required for each coded block. The three value flag is entropy encoded using the entropy encoder engine.

In one example this coding engine may be constituted by the Context Adaptive Binary Arithmetic Coding (CABAC) which encodes the bits of the binary string associated to each data. The binarisation for the three value flag associated to the DPCM prediction direction can be done by using one bit equal to zero when no residual DPCM prediction is required and using two bits equal to '10' and '11' for residual DPCM along the horizontal and vertical direction respectively.

In another example when only the horizontal and vertical directions are considered for residual DPCM prediction, two binary flags can be used to transmit the selected DCPM prediction. The first flag specifies whether residual DPCM is required for the current block. If this first flag is equal to one, then the second flag specifies the direction (horizontal or vertical).

In still another example, four directions may be considered to further exploit the spatial correlation in motion compensated residuals: horizontal, vertical, 45 degree and 135 degree (see FIG. 5(d)). In this example three binary flags can be used to signal the selected residual DPCM direction for each block. The first flag signals whether to use residual DPCM prediction. The second flag indicates the type of direction: i.e. either orthogonal or diagonal and finally the last flag indicates the direction for the corresponding value of the second flag. Therefore, when the second flag is equal to zero (orthogonal direction type) if the third flag is equal to zero then horizontal direction is selected otherwise vertical one is used. In the same way when the second flag is equal to one (diagonal direction type) the third flag equal to zero indicates 45 degree prediction direction while the third flag equal to one indicates 135 degree prediction direction.

Figure 6:
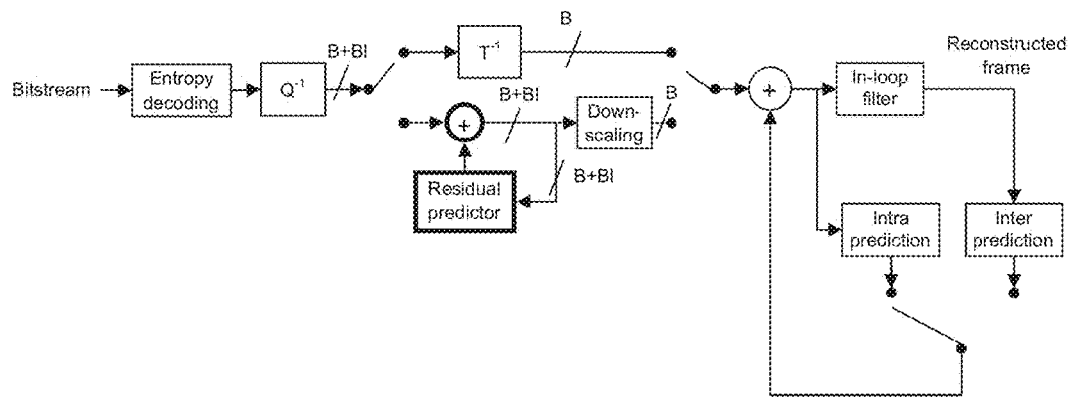
FIG. 6 shows an example of block-based decoder where the differential residuals are decoded in higher accuracy along with the residuals associated to the original video signal.

The described differential samples processing illustrated in FIGS. 3 and 4 can be also embedded in a video codec architecture as the one specified in the MPEG-x and H.26x video coding standards. In particular FIG. 6 shows a block-based decoder which decodes differential samples constituted by either residuals or differential residuals. The differential samples are entropy decoded in higher accuracy (i.e. B+BI bit-depth). Then, depending on the mode selected at the encoder and communicated to the decoder, the differential samples can be processed either as residual or as differential residual. It will be understood by the embodiments of this invention that differential residuals are processed in the "transform-skip" case where no spatial transformation is performed. In both cases, after the associated processing is concluded, the obtained residuals are available in lower precision and are then added to the intra or inter predictor to obtain the reconstructed video signal.

Figure 7:
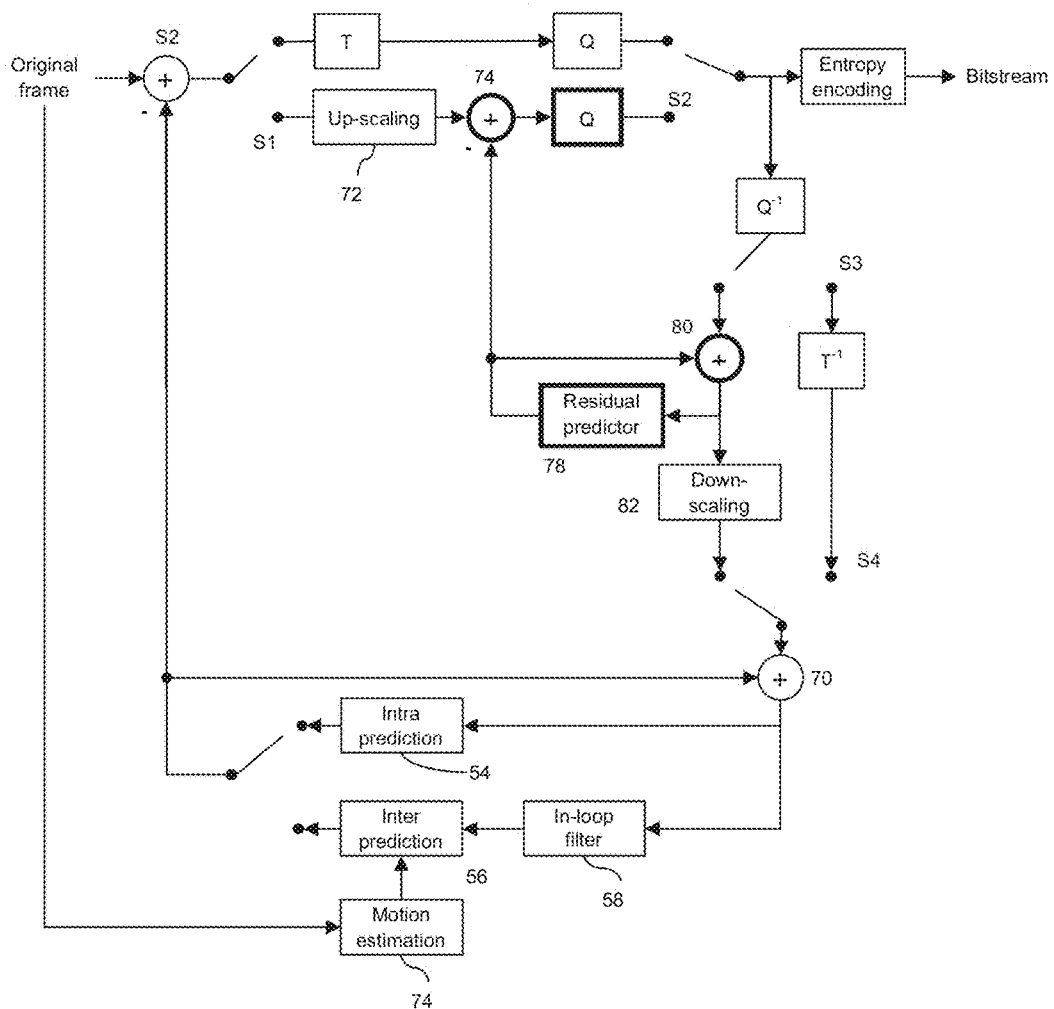
FIG. 7 shows an example of block-based encoder which forms a compressed bit-stream by computing both residuals and differential residuals.

A possible block-based encoder which produces the bit-stream processed by the decoder in FIG. 6 is shown in FIG. 7. In this figure a prediction block is subtracted from the current block of the original frame at subtractor 52. This prediction block may as well known be formed in an intra prediction process 54 or an inter prediction process 56. In the inter prediction loop, there is a loop filter 58. The inter prediction process 56 also receives an input from a motion estimation process 60 which operates in known manner.

An election is made (illustrated as switches S1 to S4) whether or not to transform the block. This election may be made block by block or for a plurality of blocks. In the "transform" setting of switches S1 to S4, the block is in conventional fashion transformed at T and quantised at Q. This, after entropy coding, forms essentially the compressed bitstream which is output. As is well known, a local loop is formed to ensure that the encoder uses as its block prediction only values which are available to the remote decoder. So inverse quantiser $Q^{-1}$ and inverse transform $T^{-1}$ provide, after adding back of the previous prediction at adder 70, the input to the intra or inter predictors.

In the "transform skip" setting of switches S1 to S4, the transform T is skipped. After the up-scaling 72 which is required to bring the samples of the block to the same bit depth of the transform coefficients which are the output of the transform T, a residual prediction is subtracted in subtractor 74 before quantisation Q. The residual prediction is formed in residual predictor 78 operating on the output of the inverse quantiser $Q^{-1}$ and adding back of the previous residue prediction in adder 80. It should be noted that (as signified in FIG. 5 by the use of bold lines) the residue prediction 78, together with subtractor 74, adder 80 and quantisation Q of the differential residue, operate sample-by-sample rather than at the block-by-block processing elsewhere in the Figure. To provide the correct residual values in the block prediction process, the residuals are down-scaled at 82.

Figure 8:
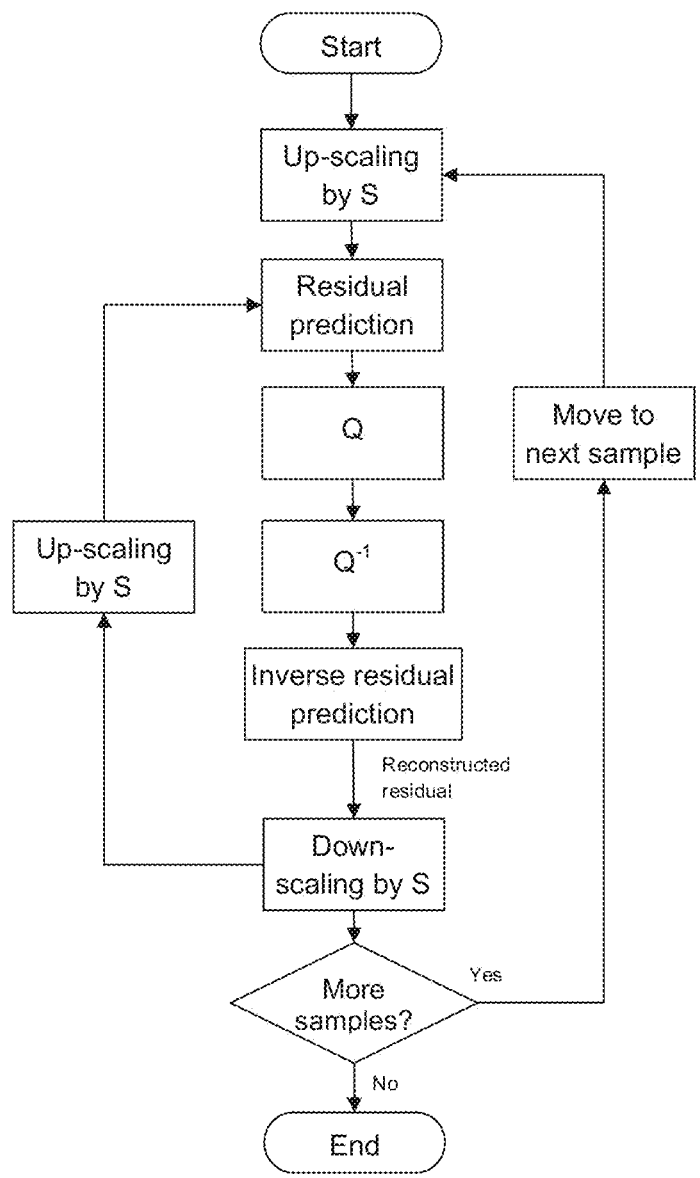
FIG. 8 shows a flowchart whereby the predictor used to compute differential residuals is down-scaled.
Figure 9:
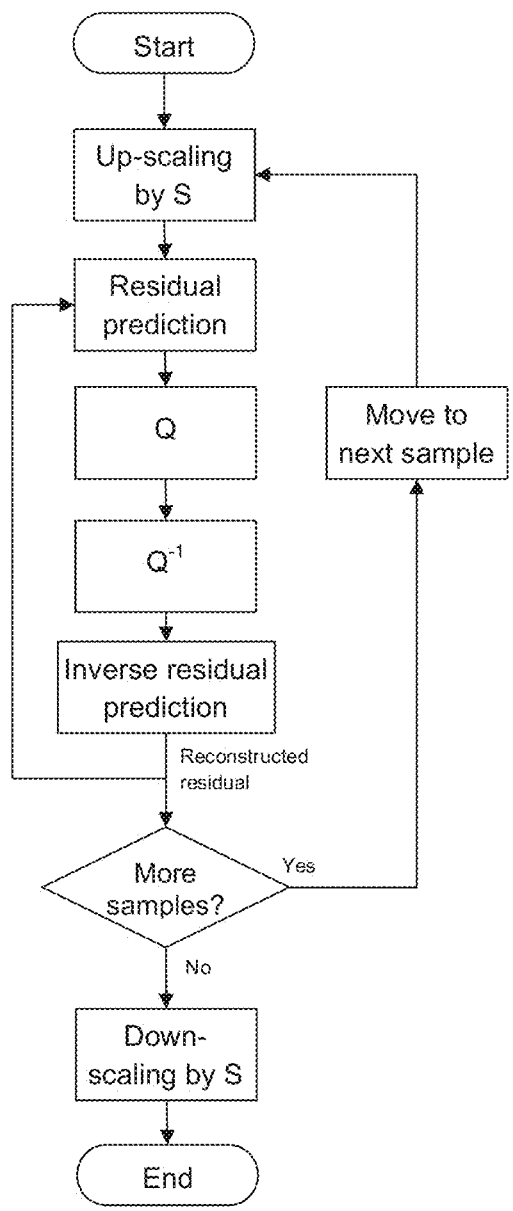
FIG. 9 shows a flowchart whereby the predictor used to compute differential residuals is kept at higher level of accuracy.

The encoding and decoding of differential residuals samples in higher accuracy allows to minimise the rounding errors related to both quantisation and down-scaling. In particular FIG. 8 depicts a flowchart where the differential samples are produced using a predictor which is down-scaled after each residual has been reconstructed. The down-scaling introduces rounding errors which may result in a lower compression efficiency. In order to keep the predictor used to produce the differential residuals in higher accuracy, the processing is modified according to FIG. 9. Accordingly, the down-scaling only happens when all the differential samples have been produced. A theoretical and experimental analysis on the effects brought by the processing depicted in FIG. 8 and FIG. 9 is now presented.

With reference to Eq. (1) FIG. 4, and FIG. 5, the residual prediction process for each sample can be generalised as follows:

$$r'(y,x)=r(y,x)-p(y,x), \quad (3)$$

where the predictor p is associated to the selected residual prediction direction (e.g. horizontal or vertical). As discussed previously, an up-scaling operation can be performed to increase the level of accuracy during residual prediction. In one example, the up-scaling can be the one performed during transform skip as specified in the HEVC standard. The HEVC standard up-scales the residual when the transform is skipped to apply the same level of quantisation to all the residuals (i.e. those transformed and those transform skipped). This is described also in WO 2013/001279 which is hereby incorporated by reference. After inverse quantisation, HEVC applies a down scaling to bring the residuals at their original level of precision. It will be now understood that if the described residual prediction were simply to be applied to an HEVC codec, the down-scaling required by HEVC would be included in the processing loop as depicted in the flowchart of FIG. 8. Conversely, in the present invention, the down-scaling operation would be placed outside the processing loop in a HEVC codec, to provide the described residual prediction with increased precision, This is illustrated in the flow chart of FIG. 9. These two different approaches for residual prediction, i.e. with and without the down-scaling module in the processing loop, will be now be compared to demonstrate the benefits of the residual prediction with increased accuracy as provided in this invention.

The residual prediction with higher accuracy proposed in this invention brings a residual energy for r', given by:

$$E[(r')^2]=E[(r-p)^2]=E[r^2]+E[p^2]-2\cdot E[r\cdot p]. \quad (4)$$

If instead the down-scaling is inserted in the processing loop, the predictor p will first be divided by the scaling factor S, rounded to the nearest integer and then multiplied again to S to bring it back to the same level at which quantisation takes place. The whole process can be seen as a further uniform quantisation applied to p to obtain p*:

$$p^* = \left\lfloor \frac{p}{S} \right\rfloor \cdot S = p + \eta, \quad (5)$$

where η denotes the quantisation noise associated to the down-scaling operation. In this case the residual r''=r−p* will be quantised and entropy encoded. The energy for this new residual is given as:

$$E[(r'')^2]=E[(r-p^*)^2]=E[(r-p-\eta)^2]=E[r^2+p^2+\eta^2-2\cdot r\cdot p-2\cdot r\cdot \eta+2\cdot p\cdot \eta]. \quad (6)$$

Using the linearity of the expectation operator and assuming that the noise η is uncorrelated with r and p it yields:

$$E[(r'')^2]=E[r^2]+E[p^2]+E[\eta^2]-2\cdot E[r\cdot p]=E[(r')^2]+E[\eta^2]. \quad (7)$$

This derivation shows that by performing down-scaling, the energy of the residuals to be encoded is increased by the energy of the quantisation noise associated to down-scaling. The overall effect of the increased level of accuracy for residual prediction proposed in this invention results in an improved compression efficiency of the video codec.

The improved compression efficiency brought by the residual up-scaling described in this invention is also demonstrated experimentally in the following. The reference software codec for the HEVC standard has been modified to implement the residual prediction method described in the invention, with application on motion-compensated (inter coded) residuals. Two implementations of residual prediction are tested: one according to the invention and one without the up-scaling of the residuals. For both these implementations the bit-rate reduction and Signal-to-Noise-Ratio (SNR) level is measured over a wide set of video sequences which benefit from the application of the method described in the invention. In particular, each tested video sequence is encoded three times: with a HEVC codec without the residual prediction method described in the invention, with residual prediction without increased precision and with residual prediction with increased precision (according to the invention). The bit-rates and SNR levels for each compressed video sequence with residual prediction are compared to the reference HEVC-coded sequence without the residual prediction. The bit-rate reductions brought by the two codec implementations at the same SNR level of the reference are assessed. This evaluation method, which is also used in the development in HEVC, is further detailed in the following reference: G. Bjøntegaard, "Calculation of average PSNR differences between RD-curves", VCEG-M33, Austin, Tex., USA, April 2001.

In the following tables the bit-rate reductions averaged across test material used in HEVC standardisation are reported whereby a negative value means a bit-rate reduction while a positive value denotes a bit-rate increment for the same SNR level of the tested method and the reference. Finally, the bit-rate reductions refer to two coding configurations: one where an intra frame is inserted roughly every one second of video and the other when only the first frame is encoded as intra. The first configuration will be denoted as Random Access while the second as Low Delay.

TABLE 1

Bit-rate reductions (negative percentages) against the reference when using the residual up-scaling described in this invention.

| | Random Access | | | | Low Delay | | |
|---|---|---|---|---|---|---|---|
| | Y | U | V | | Y | U | V |
| Class F | −0.3% | −0.1% | 0.0% | Class F | 0.0% | −0.6% | −0.4% |
| SC RGB 444 | −1.7% | −1.6% | −1.6% | SC RGB 444 | −1.9% | −1.7% | −1.9% |
| SC YUV 444 | −0.4% | −0.5% | −0.7% | SC YUV 444 | −0.8% | −1.0% | −0.9% |

TABLE 2

Bit-rate increases (positive percentages) against the reference when the residual up-scaling described in this invention is not used.

| | Random Access | | | | Low Delay | | |
|---|---|---|---|---|---|---|---|
| | Y | U | V | | Y | U | V |
| Class F | 2.7% | 2.6% | 2.7% | Class F | 2.8% | 1.9% | 2.5% |
| SC RGB 444 | 3.5% | 3.3% | 3.4% | SC RGB 444 | 5.2% | 5.1% | 5.1% |
| SC YUV 444 | 0.9% | 1.0% | 0.9% | SC YUV 444 | 1.1% | 0.9% | 1.1% |

Tables 1 and 2 summarise the results for three classes of videos containing computer generated objects which are used in HEVC development activities (Class F, SC RGB 444 and SC YUV 444). Each result in the table is an average over a number of sequences in each class. The data in Table 1 refer to the bit-rate reductions compared to the reference for the implementation with the up-scaling (increased precision during prediction) described in this invention. As may be noted, there are always bit-rate reductions (i.e. negative values). Conversely, if the up-scaling described in this invention is not adopted for residual prediction, then there will be bit-rate increments mainly given to the lower quality of the predictor used to obtain the differential residuals as shown in Table 2. The results demonstrate that the increased precision during prediction of residuals is the key component of the residual prediction method since it provides bit-rate reductions while preserving the same quality of the compressed bit-stream, compared to coding without residual prediction.

The up-scaling described in this invention increases the accuracy of coded data to minimise rounding errors and is applied to blocks where prediction of residuals is used. A generalisation of the up-scaling presented in this invention consists in the use of increased accuracy also in the main prediction to generate the residuals. Currently video coding standards as HEVC allow increase of the internal accuracy with the same general aim of aim minimising rounding errors. The up-scaling used in the HEVC standard is known by those skilled in the art as Internal Bit Depth Increase (IBDI). IBDI mandates to up-scale input frames as they read in memory and the carry out all the encoding in higher precision. Although IBDI provides coding gains, it requires increased storing capacity, namely for reference frames and previously decoded pixels used in intra prediction. Differently then from IBDI, this invention consists in a method which performs prediction with increased accuracy but with reference frame samples in the targeted output (lower) precision. At the decoder, in order to keep the low precision of stored reconstructed pixels, the down-scaling is applied after reconstruction of a block of pixels has been performed and the obtained frame is then stored to serve as future reference for inter or intra prediction.

Figure 2:
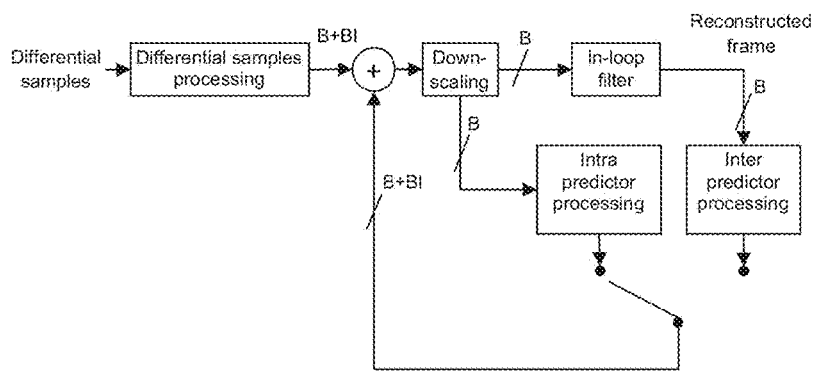
FIG. 2 shows an example of image sample reconstruction from residuals in performed in higher accuracy and then the obtained signal is down-scaled to be stored in memory.
Figure 10:
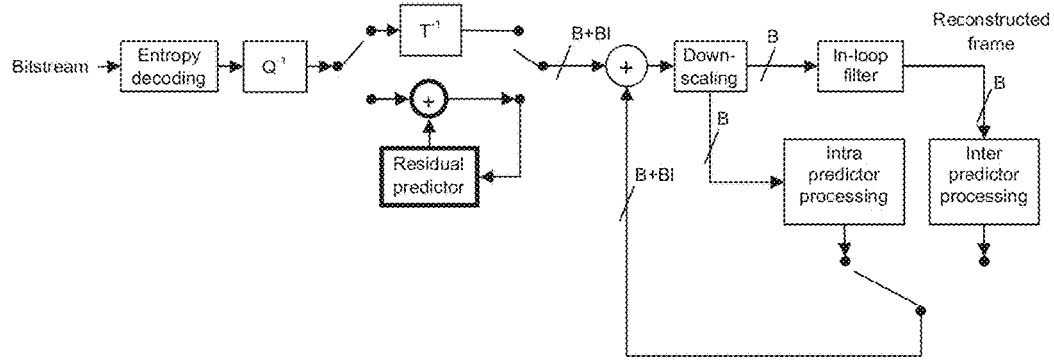
FIG. 10 shows a block-based decoder where the video signal is reconstructed in higher precision and then down-scaled to be further processed and stored in memory.
Figure 11:
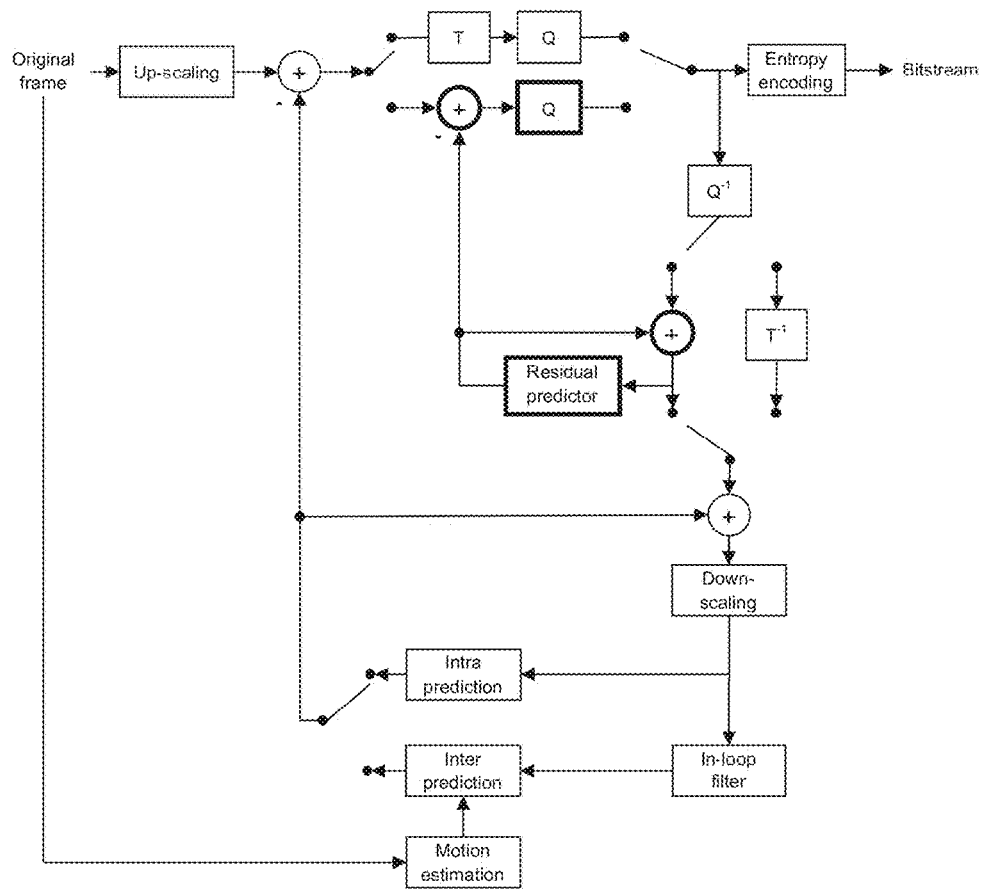
FIG. 11 shows a block-based encoder where the differential samples are computed in higher accuracy and a down-scaling takes place after signal reconstruction.

As a generalisation of the general framework depicted in FIG. 1 and FIG. 2, FIG. 10 shows a decoder which performs the described differential samples processing, i.e. both for residual with inverse transform and differential residuals with skipped transform, and keeps the obtained residuals in higher precision. The reconstruction of the video signal is also done in higher accuracy with a predictor. The down-scaling is then done after reconstruction when the decompressed video signal is ready to be processed (e.g. by in-loop filtering) and then stored in memory. In the decoder depicted in FIG. 10, the predictor coming out from the intra and inter predictor processing modules is in higher precision. It is assumed in this invention that the prediction process embeds the required up-scaling processing to bring the accuracy to the desired level (e.g. B+BI). An encoder corresponding to the decoder in FIG. 10 is shown in FIG. 11. Comparison with the embodiment shown in FIG. 7 highlights the differences that in FIG. 11 up-scaling is performed before subtraction of the predictor block and, in the local loop, down-scaling is performed after adding back of the predictor block. For the avoidance of doubt, it is clarified that in the local loop of the encoder there is no up-scaling within the prediction processes. This is in contrast with what has been described in the prediction processes within the decoder of this embodiment.

In some practical implementations it is required to limit the overall number of bits that represent a sample. For example, for B+BI=16 is the precision of differential samples and the prediction, the results of their addition will require 17-bit representation (but in the terms of this invention the same precision is preserved). In order to keep this result to keep 16-bit representation a clipping can be use which also reduces the precision since a 17-bit number is now clipped to 16-bit number. Therefore, to keep high precision of prediction but to avoid sample bit representation overflow the result of the addition of the predictor and the differential samples in higher accuracy can be reduced by clipping to a precision that is still higher than the precision of the reconstructed samples.

It should be understood that this invention has been described by way of examples only and that a wide variety of modifications are possible without departing from the scope of the invention. For example, whilst it is convenient in the case of a transform skip mode to use the up-scaling which is required to bring the sample values to the same bit depth as the transform coefficients, it will be possible in the general case to select an appropriate scaling factor.

The invention claimed is:
1. A video decoder comprising:
   a predictor for forming a prediction from reconstructed residuals; and
   an adder for adding the obtained prediction to differential residual samples to obtain reconstructed residual samples, wherein differential residuals are formed from residuals by performing sample-based prediction according to one of the following modes: no prediction, prediction along horizontal direction and prediction along a vertical direction, wherein for inter coded blocks the use of the sample-based residual prediction is decoded from the bit-stream via two binary flags: one to indicate the use of sample-based residual prediction and the other to indicate the direction to perform sample-based residual prediction.

2. A video decoder according to claim 1 where the sample-based residual prediction includes Differential Pulse Code Modulation (DPCM).

3. A video decoder according to claim 1 where for intra coded blocks the selection of the residual prediction mode is determined by the intra block prediction mode.

4. A video decoder according to claim 1, comprising a down-scaler for performing down-scaling of the reconstructed residual samples.

5. A video encoder comprising:
   a predictor for forming a prediction from reconstructed pixels; and
   a subtractor for subtracting the obtained predictor from samples to obtain residual samples,
   wherein differential residuals are formed from residuals by performing sample-based prediction according to one of the following modes: no prediction, prediction along a horizontal direction and prediction along a vertical direction, wherein the use of the sample-based residual prediction for inter coded blocks is signalled in the bit-stream via two binary flags: one to indicate the use of sample-based residual prediction and the other to indicate the direction to perform sample-based residual prediction.

6. A video encoder according to claim 5 where the sample-based residual prediction includes Differential Pulse Code Modulation (DPCM).

7. A video encoder according to claim 5 where for intra coded blocks the selection of the residual predictor mode is determined by the intra block prediction mode.

8. A non-transitory computer program product comprising instructions adapted to cause programmable apparatus to implement a method of video decoding to reconstruct an image from differential samples, the method comprising the steps of:
   forming a prediction from reconstructed residuals; and
   adding the obtained prediction to differential residual samples to obtain reconstructed residual samples,
   wherein differential residuals are formed from residuals by performing sample-based prediction according to one of the following modes: no prediction, prediction along a horizontal direction and prediction along a vertical direction, wherein for inter coded blocks the use of the sample-based residual prediction is decoded from the bit-stream via two binary flags: one to indicate the use of sample-based residual prediction and the other to indicate the direction to perform sample-based residual prediction.

* * * * *